(Model.)
J. PATZEM & L. WAGNER.
DRIVE CHAIN.
No. 285,430. Patented Sept. 25, 1883.
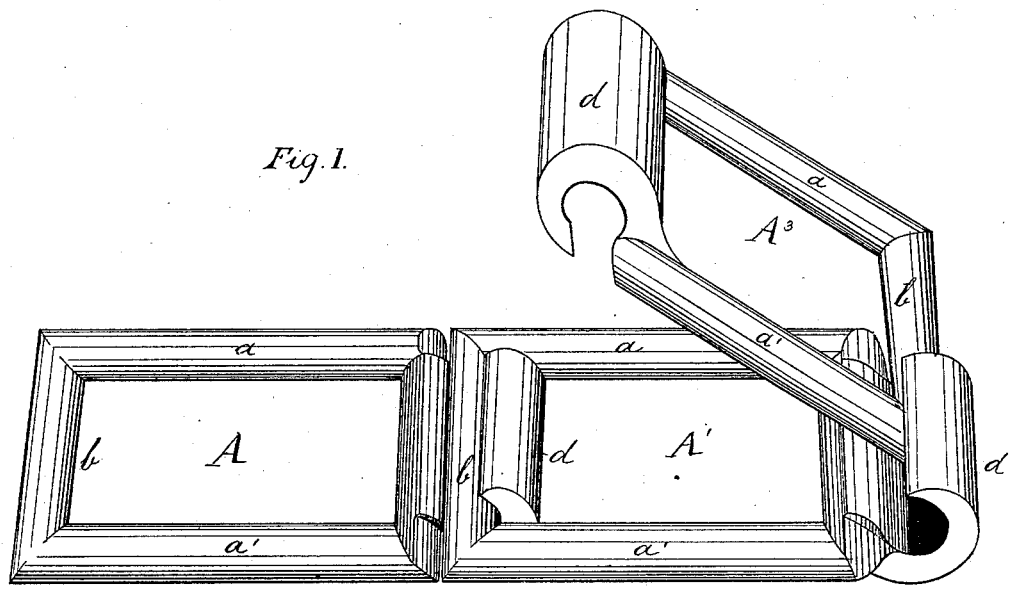
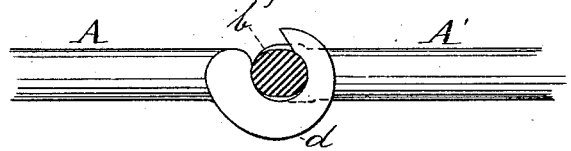
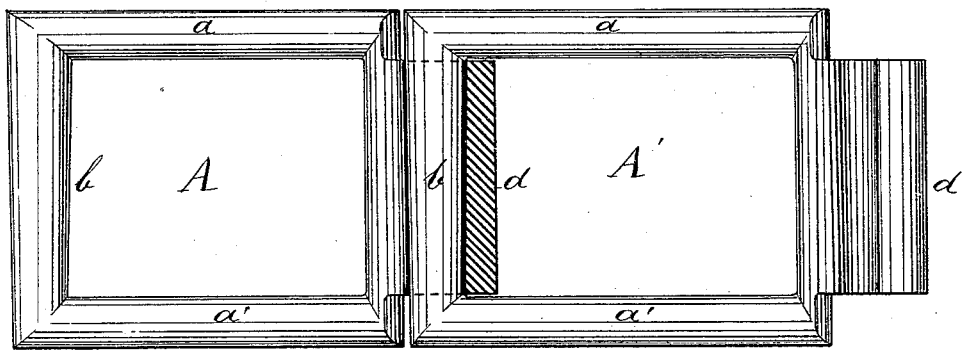
WITNESSES:
INVENTORS
Joseph Patzem
Louis Wagner
BY Wm C Lotz
ATTORNEY

UNITED STATES PATENT OFFICE.

JOSEPH PATZEM AND LOUIS WAGNER, OF CHICAGO, ILLINOIS, ASSIGNORS OF ONE-THIRD TO PETER DELP, OF SAME PLACE.

DRIVE-CHAIN.

SPECIFICATION forming part of Letters Patent No. 285,430, dated September 25, 1883.

Application filed June 21, 1883. (Model.)

*To all whom it may concern:*

Be it known that we, JOSEPH PATZEM and LOUIS WAGNER, citizens of the United States of America, residing at Chicago, in the county of Cook and State of Illinois, have invented certain new and useful Improvements in Drive-Chains, of which the following is a specification, reference being had therein to the accompanying drawings.

This invention relates to endless chains that, in conjunction with sprocket-wheels, are useful for transmitting motion or for driving machinery; and that consist of links thus connected by means of open sockets or hook-like couplers partly surrounding the end bars of the link, that when in working position the links are inseparable and capable of only a hinge-like relative motion, but when folded to an inverted angular position any two of such links may be uncoupled by laterally shifting the end bar of one link out of the socket of the other link. These links, for the purpose of enabling their coupling in the manner described, heretofore had cylindrical end bars, and had a notch in one side bar, at or near its junction with the end bar, to reduce the thickness sufficiently for passing through the opening of the socket, which notching, however, weakened the links to a great extent and caused their frequent breaking; and it is the object of this our invention to construct a drive-chain the links of which can be coupled and uncoupled without being weakened by the notches.

Our invention therefore consists in the novel devices and combination of devices hereinafter described and specifically claimed.

In the drawings, Figure 1 represents a perspective view of a piece of chain with one of the links in position of being coupled or uncoupled. Fig. 2 is a sectional edge view of the coupling portions of two links, and Fig. 3 sectional plan of two links coupled.

Corresponding letters in the several figures of the drawings designate like parts.

A A′ A² denote the several chain-links, each formed of a rectangular frame, that has two cylindrical longitudinal bars, $a$ $a'$, a frusto-conical or tapering end bar, $b$, that sectionally is shaped oval, and the end hook, $d$, which is of a length laterally to enter between the side bars, $a$ $a'$, and is cored out conical to form a close joint around the tapering end bar, $b$, of the adjoining link when coupled therewith. The end bar, $b$, of a link, A, can be laterally inserted into the open socket or hook-like coupling $d$ of the other link by holding such links on a relative angular position, and by inserting the small-diameter end of pin $b$ into the large-cored end of the hook $d$, and then by shifting the links together until the hook $d$ is situated between the two side bars, $a$ $a'$, when with turning the links to be on a straight line they are locked together, and the oval-shaped end bar, $b$, fills up the socket of the hook longitudinally, so as to take up all lost motion that was provided for readily coupling the parts. Links thus constructed are more easily coupled for forming the drive-chain, and are much stronger and have less lost motion in their hinge-like couplings than such chains heretofore constructed.

What we claim is—

A detachable driving-chain the links of which are provided with frusto-conical end bars at one end of the links and having open hooks at the opposite ends, which are cored to correspond with the form of the end bars, and adapted to be coupled and uncoupled in the manner and for the purpose set forth.

In testimony whereof we affix our signatures in presence of two witnesses.

JOSEPH PATZEM.
LOUIS WAGNER.

Witnesses:
H. W. HUEHL,
R. G. SCHMID.